(No Model.)
A. HUTCHISON.
MEANS FOR DISCHARGING TAR FROM HYDRAULIC MAINS IN GAS WORKS.
No. 312,565. Patented Feb. 17, 1885.
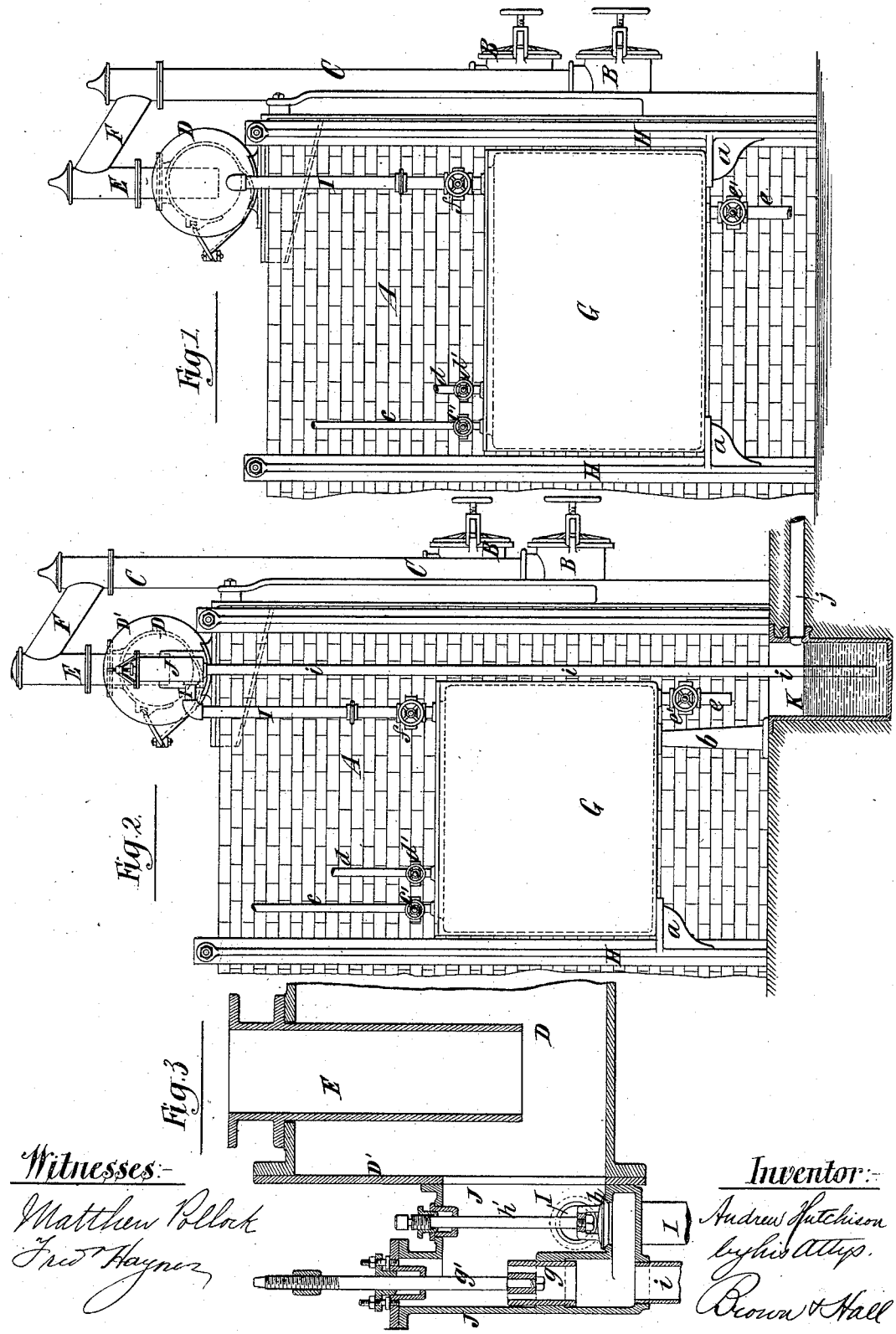
Witnesses:—
Matthew Pollock
Fred Haynes
Inventor:—
Andrew Hutchison
by his Attys.
Brown & Hall
N. PETERS, Photo-Lithographer, Washington, D. C.

UNITED STATES PATENT OFFICE.

ANDREW HUTCHISON, OF PROVIDENCE, RHODE ISLAND.

MEANS FOR DISCHARGING TAR FROM HYDRAULIC MAINS IN GAS-WORKS.

SPECIFICATION forming part of Letters Patent No. 312,565, dated February 17, 1885.

Application filed April 12, 1884. (No model.)

*To all whom it may concern:*

Be it known that I, ANDREW HUTCHISON, of Providence, in the county of Providence and State of Rhode Island, have invented a new and useful Improvement in Means for Discharging Tar from Hydraulic Mains and other Vessels in Gas-Works, of which the following is a specification.

In hydraulic mains of gas-works the dip-pipes which conduct the gas downwardly into the main are closed at the bottom by a liquid seal, and an overflow is provided in order to keep the ends of the dip-pipes sealed to the required depth.

My invention relates to means which are employed to provide for the automatic discharge of tar from the bottom of the hydraulic main, and the automatic introduction of water into the main to maintain a proper liquid level therein and still prevent the excessive accumulation of tar.

The invention consists, essentially, in the combination, with a hydraulic main or other vessel provided with an overflow gate or valve for maintaining a liquid-level therein, of a closed tank or receptacle below the main or vessel, and a tar-pipe leading from the lower part of the main or vessel behind said gate to the tank or receptacle. Before the works are started the tank or receptacle and the main or vessel, to the desired level, are filled with water, and as the tar passes from the main or vessel downward to the tank or receptacle the water rises through the same pipe from the tank into the main. The overflow gate or valve performs its usual function of regulating the liquid-level in the main.

In the accompanying drawings, Figure 1 is an elevation of a portion of a retort-bench surmounted by a hydraulic main to which my invention is applied, the tar-pipe extending from that end of the main which is opposite the overflow-gate or tar-gate. Fig. 2 is a similar view showing the tar-pipe extending from the tar-gate to the tank or receptacle and independent of the pipe which extends from said gate to the tar-pot, and Fig. 3 is a sectional elevation of the end portion of the main and the tar-gate or overflow-gate on a larger scale.

Similar letters of reference designate corresponding parts in the several figures.

A designates the setting of a retort-bench, and B designates the mouth-pieces of the retorts, from which extend the usual stand-pipes, C. On the top of the retort-bench is arranged the hydraulic main D, which may be of the usual or any suitable construction. The main here shown is like that which forms the subject of the application for Letters Patent, Serial No. 119,107, filed January 29, 1884, by Charles W. Isbell, and forms no part of my invention. The stand-pipes C are connected with the dip-pipes E by the usual bridge-pipes, F, which appear in Figs. 1 and 2.

G designates a tank or receptacle, which is arranged at a point below the main D and preferably at the side of the retort-bench or between two benches of retorts.

In order not to obstruct the passage between existing retort-benches, I prefer to make the tank or receptacle G with but little thickness, and secure the necessary capacity by making it of considerable height and length. It may be supported in any suitable way—as, for example, by brackets $a$ projecting from the buck-stays H, as in Fig. 1, or by one such bracket and a pillar, $b$, as in Fig. 2.

The tank or receptacle G is water-tight, and may be made of boiler-iron or other suitable material. It is provided with a water-supply pipe, $c$, in which is a valve, $c'$, and which may lead from a pump or any other suitable source of water, and is also provided with a vent pipe and valve, $d\ d'$, and a discharge pipe and valve $e\ e'$, which may lead to the usual tar pot or well, as shown in Fig. 2.

The tank or receptacle G is connected with the main D at a point near its bottom by a tar-pipe, I, in which is a valve, $f$. In Fig. 1 the pipe I leads from the end of the main at which there is no "tar-gate" or overflow-gate, and is connected with the head or end of the main near the bottom thereof. In Fig. 2 the pipe I leads from the casing J of tar-gate or overflow-gate at a point best shown in Fig. 3, to which I now refer. The casing J of the gate is secured to the head D' of the main D, and in said casing are fitted the usual adjustable overflow gate or valve, $g$, which may be manipulated through its stem $g'$, and the discharging-valve $h$, which may be opened by its stem $h'$, and which provides for emptying the main when desired. From the casing J at a point out-side the two valves *g h* leads the usual overflow-pipe, *i*, which extends downward to the tar-pot K, (shown in Fig. 2,) and from which a pipe, *j*, leads to the tar-well. (Not here shown.) As shown in Fig. 3, the tar-pipe I leads from the casing J at a point inside or behind the valves *g h*, and hence the flow through it is in no wise controlled by said valves. The pipe I is close to the bottom of the main, as shown in Fig. 3.

The operation of my invention is very simple. On starting, the valves *d' e'* are both closed, and the valve *c'* is opened to admit water, which fills the tank or receptacle G, and rises through the pipe I into the main until the latter is filled sufficiently full to seal the dip-pipes E. This may be readily ascertained by a gage applied to the main, or by the overflow and discharge of water through the pipe *i*, the overflow-gate *g* having been previously properly adjusted. The valve *c'* is then closed and the works started. As fast as the tar enters the main D, it flows at once downward through the pipe I before it becomes thickened or hard, and the water displaced from the tank or receptacle G by the entering tar rises through the pipe I and into the main, thereby maintaining always a water seal in the main. If desired, a separate pipe extending from the tank or receptacle G to the main at a point above its bottom might be provided, and in such case the water might rise in the latter pipe to take the place of the tar descending through the pipe I. The operation is continued until the tank or receptacle G becomes filled with tar, when the valve *f* is closed and the valves *d' e'* opened, to vent the tank G and allow its contained tar to flow out through the pipe *e* and into the tar-pot K or other receptacle. When the tank or receptacle is empty of tar, the valve *e'* is closed, and the valve *c'* is opened to admit water, and when the tank or receptacle is filled with water the valve *c'* and the vent-valve *d'* are closed and the valve *f* opened, the operation being continued as before.

The operation of the works is continued while discharging the tank or receptacle G, and I thus enable the main to be kept free of any accumulation of tar without necessitating the stoppage of the works.

When my invention is to be applied to a gas-scrubber or other vessel, a tank similar in purpose to the tank G will be arranged below and connected with the bottom of the scrubber or vessel, as herein described with reference to the main D.

By the use of the term "behind the tar-gate or overflow-gate," as used in this specification and claims, I mean that the tar-pipe communicates directly with the main, and that the tar to reach the tar-pipe does not have to flow through said gate.

What I claim as my invention, and desire to secure by Letters Patent, is—

1. The combination, with a hydraulic main or other vessel provided with an outlet-gate or overflow for maintaining a liquid-level therein, of a closed tank or receptacle arranged below said main or vessel, and a tar-pipe leading from the lower part of the main or vessel behind said gate to the tank or receptacle, substantially as and for the purpose herein described.

2. The combination, with the main D and tank or receptacle G, of the gate-casing and overflow valve and pipe J *g i*, the tar-pipe and valve I *f*, the water-supply pipe and valve *c c'*, and the discharge pipe and valve *e e'*, substantially as and for the purpose herein described.

ANDREW HUTCHISON.

Witnesses:
 A. B. SLATER,
 WILLIAM P. NYE.